L. E. WATERMAN.
WHEEL ADJUSTING MECHANISM FOR AGRICULTURAL IMPLEMENTS.
APPLICATION FILED JUNE 9, 1919.
1,381,374.
Patented June 14, 1921.
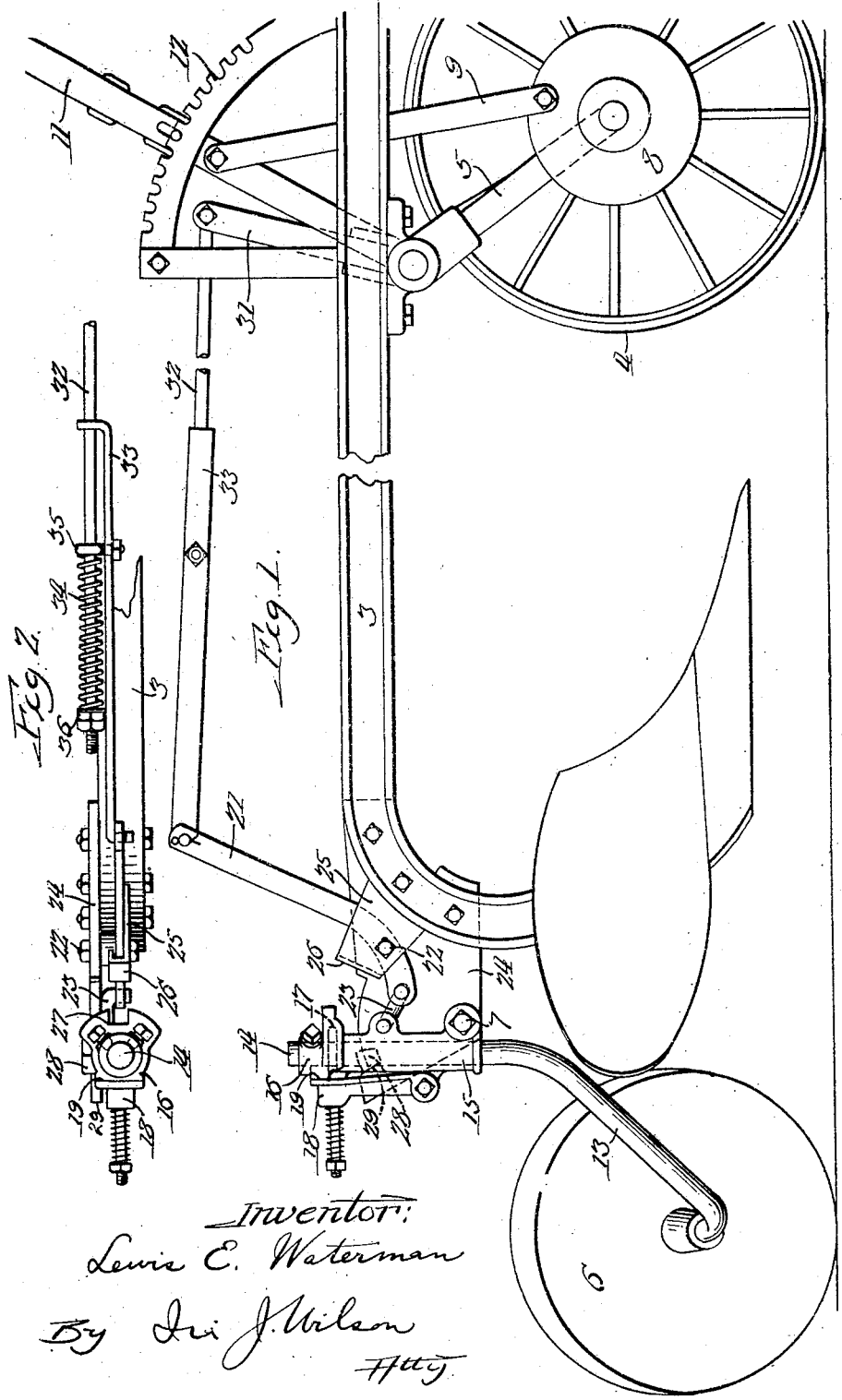
Inventor:
Lewis E. Waterman
By Iri J. Wilson
Atty

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

WHEEL-ADJUSTING MECHANISM FOR AGRICULTURAL IMPLEMENTS.

1,381,374.  Specification of Letters Patent.  Patented June 14, 1921.

Application filed June 9, 1919. Serial No. 302,662.

*To all whom it may concern:*

Be it known that I, LEWIS E. WATERMAN, a citizen of the United States, residing at Rockford, in the county of Winnebago and State of Illinois, have invented certain new and useful Improvements in Wheel-Adjusting Mechanism for Agricultural Implements, of which the following is a specification.

This invention pertains to wheeled plows equipped with power operated means for raising and lowering the plow body, and has more particular reference to that class in which the plow frame is carried by forward land and furrow wheels and a rear furrow wheel, and mechanism operated generally by traction of the land wheel is provided for raising the plow frame both at its forward and rear ends.

The present improvements relate more particularly to the means for raising and lowering the rear end of the plow-carrying frame, and the primary object is to improve the connection between the rear furrow wheel and the power-operated mechanism with the view to obtaining a more practical and satisfactory operation of the rear furrow wheel regardless of adjustments for varying the working depth of the plows.

Another object is to improve the mounting of the rear furrow wheel in its connection with the frame and also to improve the immediate means for tilting this furrow wheel and holding it in its several operative positions, so as to obtain a more durable and practical construction and one which will function properly under all conditions.

Other objects and attendant advantages will be appreciated as the invention becomes better understood by reference to the following description when considered in connection with the accompanying drawing, in which—

Figure 1 is a side elevation of the furrow side of a wheeled plow embodying my improvements; and Fig. 2, a fragmentary plan view of the means for tilting the rear furrow wheel.

This invention relates to that class of wheeled plows shown in my Patent No. 1288773, Dec. 24, 1915, which illustrates and describes mechanism operated by the land wheel for raising and lowering the forward and rear ends of the plow-carrying frame simultaneously. In considering the present improvements the power-operated lifting mechanism *per se* may be of any suitable or preferred construction, and since these power lifting mechanisms are well known in the art I have deemed it necessary to illustrate one simply diagrammatically. Referring to the drawing, the plow-carrying frame designated generally by character 3 may be suitably constructed to carry one or more plow bodies and is supported at its forward end by a land wheel 4 connected to the frame through the agency of a crank 5, a front furrow wheel (not shown), and a rear furrow wheel 6 connected to the rear end of the plow frame and adapted to tilt about the pivot bolt 7 for raising and lowering the rear end of the plow frame.

The power operated mechanism for raising the plows may be of any suitable or preferred construction, and in the present instance is shown simply for purpose of illustration as comprising a suitable clutch mechanism mounted on the end of the crank 5 and having a revoluble part 8 normally inactive and adapted to be connected at will with the land wheel 4 and rotated thereby in half revolution movements, a link 9 connected at one end eccentrically to the part 8 and at its opposite end to an adjusting lever coöperating in the usual way with a notched segment 12 fixed to the plow frame. It will be evident that upon rotating the part 8 a half revolution in a clockwise direction viewing Fig. 1, the crank 5 will be rocked in a counter-clockwise direction so as to raise the land wheel relatively to the plow frame and lower the plow body to working position. Upon the next successive half revolution movement of the part 8 in the same direction the plow will be raised to its elevated position. By means of a connection between the crank 5 and the rear furrow wheel the rear end of the plow frame will be raised or lowered simultaneously with the forward end of the frame. The plow will be lowered to a given working depth and raised to a given elevation upon respective actuations of the power lift mechanism so long as the lever 11 remains in the set position shown. In other words, this lever determines the working depth of the plow and by setting the lever forwardly or rearwardly from the position shown, the working depth will be diminished or increased respectively, as the case may be.

I have now aimed to connect the rear furrow wheel to the plow frame through the agency of an upright spindle and a spindle bracket permitting the furrow wheel to caster, which bracket is pivotally connected with the frame so as to swing forwardly and rearwardly for raising and lowering the frame, and to provide means for limiting this rearward swinging movement to prevent the wheel from running under the frame and to aid in preventing the wheel from castering when the plow is backed. Since the rear furrow wheel is operated by the power lift mechanism and the latter lifts the plow frame to different elevations by reason of adjustment of the lever 11 to obtain different working depths, I have provided a novel connection between the power lift mechanism and the rear furrow wheel which permits (when said lever 11 is in certain set positions) the front end of the plow frame to be raised after the elevation of the rear end has been limited by the above mentioned means for stopping the rear movement of the spindle bracket beyond a practical working position. This connection and the mounting of the rear furrow wheel will now be described: The rear furrow wheel 6 revolves on a crank axle 13 having an upright spindle 14 which passes through a tubular housing 15 in turn pivotally mounted at 7 on a horizontal axis on a rearward extension of the plow frame. The spindle 14 is rotatable in the housing 15 and held against longitudinal axial movement therein. For this purpose, a collar 16 fixed to the upper end of the spindle embraces an annular shoulder 17 on the bracket 15. In order to hold the furrow wheel in line and prevent it from castering too freely, a spring pressed part 18 is urged against the flat surface 19 of the collar 16 as is well understood in this art. The immediate means for tilting the bracket 15 forwardly and rearwardly about the pivot 7 consists of a lever 21 pivotally mounted intermediate its ends at 22 and pivotally connected at its lower end through the agency of a link 23 to the spindle bracket. The upper end of the lever 21 connects with the power lift mechanism as will be presently mentioned. It will be noted that the pivot bolt 22 for the lever 21 is supported at one end by the rear frame extension 24 and at its opposite end by a lever shield 25 which fits against the rear curved surface of the plow beam and has a turned over rear end 26 which serves as a fixed stop and locking element adapted to be engaged by the recesses 27 in the front side of the bracket 16 when the spindle bracket is swung forwardly. In other words, the part 25 serves as a support and shield for the lever 21 and also as a locking element for preventing the rear furrow wheel from castering when the plow is in lowered working position and as a stop for limiting forward movement of the spindle bracket. It will also be noted that the link 23 is held in position by reason of its being interposed between the lever 21 and the upright frame extension or plate 24 and that this link establishes a permanent connection between the lever and spindle bracket and one which is free from binding as might occur in the event that the connection between these parts is simple by contact. A landward extension 28 from the spindle bracket 15 is adapted by contact against the surface 29 on the rear frame extension 24 to limit rearward tilting movement of the spindle bracket, and this extension further embraces the land side of said frame extension and prevents lateral tilting movement of the bracket. It will be here noted that the spindle bracket is prevented from swinging backwardly beyond substantially a vertical position, and that if permitted to swing farther, the rear furrow wheel would, due to the relative relation of the pivot 7, have a tendency to caster sidewise and to roll under the plow frame when the plow is backed. The parts 28 and 29, therefore, prevent the rear furrow wheel from swinging beyond a practical working position when the plow is elevated.

The power from the lifting mechanism is transmitted to the lever 21 through the agency of a spring connection arranged in such manner as to allow a lost motion in two directions. This connection consists of an arm 31 fixed with the land wheel crank 5, a rod 32 connected to the arm 31 and passing loosely through a guide opening in the laterally turned forward end of a link 33 which is connected to the upper end of the lever 21, and an expansion spring 34 on the rod 32 and confined between the abutment 35 fixed to the link 33 and adjusting nuts 36 on the end of the rod 32. With the parts in the position shown in full lines in the drawing, the spindle bracket has been swung rearwardly by operation of the power lift mechanism until limited by the parts 28 and 29. This rearward motion is imparted to the spindle bracket through the agency of the spring 34. If now the lever 11 is adjusted forwardly for the purpose of diminishing the working depth of the plow and at the same time increasing the height to which the plow frame is raised for transportation, it will be manifest that only the forward end of the plow frame will be elevated and that the lost motion in the connection between the power lift mechanism and the rear furrow wheel is taken by the spring 34. Consequently, it follows that with the lever 11 set forwardly when the plow is raised from working position by the power lift mechanism the rear end of the plow frame will first reach its highest position which is limited by the parts 28 and 29 and the forward end of the frame will be further elevated to the full extent of the lifting mechanism. When the plow is lowered to working position, the lowering movement of the rear end of the plow frame will be limited by contact of the collar 16 against the stop 26, and the latter by its engagement in the recesses 27 will lock the rear furrow wheel against castering. In this lowering movement the lever 21 comes to rest before the completion of the lowering movement of the arm 31 and lost motion is permitted between these parts by reason of the fact that the rod 32 is free to slide back through the guide 35. In some adjustments of the hand lever 11, such for instance as when it is set in its most rearward position for effecting the greatest working depth and consequently raising the plow frame the least above the ground, the part 28 on the spindle bracket will not be moved rearwardly as far as the stop 29, but this position of the spindle bracket is thoroughly practical and safe.

It is believed that the foregoing conveys a clear understanding of my improvements, and while I have illustrated but a single working embodiment thereof, it should be understood that various changes might be made in the construction and arrangement without departing from the spirit and scope of the invention as expressed in the appended claims, in which—

I claim:

1. In a plow, the combination of a plow frame, supporting wheels therefor including a rear furrow wheel, power operated mechanism for raising the front end of the frame, adjusting means for varying the working depth of the plow body and consequently the height to which the frame is raised by said power operated means, a connection between the power operated means and the rear furrow wheel for raising the rear end of the frame, and means for limiting the frame-elevating movement of the rear furrow wheel, said connection including means permitting the forward end of the frame to be elevated after the rear end had been stopped by said limiting means.

2. In a plow, the combination of a plow-carrying frame equipped with a rear furrow wheel and a front carrying wheel, power lift mechanism adapted to operate said front carrying wheel for raising the plow-carrying frame to different elevations as a consequence of the different working depths of the plow, and a connection between said power lift mechanism and the rear furrow wheel for raising the rear end of the plow-carrying frame a limited distance and permitting the forward end of said frame to be raised by said mechanism beyond the limit of the rear elevating movement.

3. In a plow, the combination of a plow-carrying frame, a rear furrow wheel and a front carrying wheel therefor, a tiltable support connecting the rear furrow wheel with the frame, means for limiting the tilting movement of said support in a frame elevating direction, means for raising and lowering the front carrying wheel with respect to the frame, and a connection between the front carrying wheel and said tiltable support, whereby the latter is operated by raising movement of the front carrying wheel, including yielding means for allowing the front carrying wheel a greater frame elevating movement than is permitted of the rear furrow wheel.

4. In a plow, the combination of a plow-carrying frame, a rear furrow wheel on a spindle pivotally connected with the frame for swinging the furrow wheel vertically with respect thereto, a lever mounted on the frame and adapted to rock said spindle about its pivot, a front carrying wheel, adjustable power lift means for operating said front carrying wheel to raise the plow frame to different elevations, means for limiting the rocking movement of said spindle in both directions, and a connection between said lever and power lift means for operating the rear furrow wheel and permitting the front end of the frame to be raised by said mechanism beyond the elevation of the rear end of the frame permitted by said spindle limiting means.

5. In a plow, the combination of a plow frame, a spindle bracket pivotally mounted on the rear end of said frame to swing forwardly and rearwardly, a stop for limiting the rearward swinging movement of said bracket, a spindle carried by the bracket, a furrow wheel mounted on the spindle, an upright lever pivotally mounted intermediate its ends on the frame in front of said bracket, a link pivotally connecting the lower end of the lever to the bracket, power lift mechanism for raising the forward end of the plow frame to different elevations, and a spring connection between the upper end of said lever and said power lift mechanism for swinging the spindle bracket rearwardly into engagement with said stop and permitting further elevating movement of the forward end of the plow frame through the agency of the power lift mechanism.

6. In a plow, the combination of a plow frame, a land and rear furrow wheel, means operated by the land wheel for raising the plow frame, adjustable means for determining the working depth of the plow, a stop for limiting the lowering movement of the rear furrow wheel relatively to the plow frame when the latter is being elevated, a connection between said raising means and rear furrow wheel for raising the rear end of the plow frame simultaneously with its forward end, said connection including means for permitting the forward end of the plow frame to be elevated by said power lift means beyond the elevating limit of the rear end of the plow frame.

7. The combination of an implement frame having a vertically disposed part, a spindle bracket pivotally mounted on said frame part to swing forwardly and rearwardly, a spindle on said bracket, a carrying wheel on said spindle, a lever for swinging the spindle bracket forwardly and rearwardly, and a connection between the lever and the spindle bracket including a link interposed between the bracket and said frame part and held against displacement by the same.

8. In a plow, the combination of a plow frame, a rear furrow wheel and a land wheel, power lift mechanism operated by the land wheel for raising the front end of the plow frame, means for varying the working depth of the plow, and a connection operated by the power lift mechanism and connected with the rear furrow wheel for raising the rear end of the plow frame and having a lost motion at the completion of both the frame lowering and raising movements.

LEWIS E. WATERMAN.